(12) United States Patent
Song et al.

(10) Patent No.: US 9,049,335 B2
(45) Date of Patent: Jun. 2, 2015

(54) IMAGE SCANNING APPARATUS, METHOD FOR DISCRIMINATION OF COLOR AND COMPUTER-READABLE RECORDING MEDIUM

(71) Applicant: Samsung Electronics Co., Ltd., Suwon-si (KR)

(72) Inventors: Su-han Song, Seoul (KR); Jung-tag Gong, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/204,229

(22) Filed: Mar. 11, 2014

(65) Prior Publication Data

US 2015/0036195 A1 Feb. 5, 2015

(30) Foreign Application Priority Data

Aug. 5, 2013 (KR) ........................ 10-2013-0092530

(51) Int. Cl.
*H04N 1/04* (2006.01)
*H04N 1/60* (2006.01)
*G06K 15/00* (2006.01)
*H04N 1/10* (2006.01)

(52) U.S. Cl.
CPC ...................................... *H04N 1/10* (2013.01)

(58) Field of Classification Search
CPC ....... G06K 15/02; H04N 1/6033; H04N 1/52; H04N 1/6058; H04N 1/603; H04N 1/40062; H04N 1/4092; H04N 1/46; H04N 1/58
See application file for complete search history.

(56) References Cited

U.S. PATENT DOCUMENTS

| 5,287,204 A | * | 2/1994 | Koizumi et al. | 358/538 |
| 7,072,506 B1 | * | 7/2006 | Hirota et al. | 382/162 |
| 2005/0088696 A1 | * | 4/2005 | Kagawa et al. | 358/2.1 |
| 2010/0046831 A1 | * | 2/2010 | Kang | 382/166 |
| 2013/0223732 A1 | * | 8/2013 | Motoyama | 382/165 |
| 2014/0139856 A1 | * | 5/2014 | Ohk | 358/1.9 |

* cited by examiner

*Primary Examiner* — Cheukfan Lee
(74) *Attorney, Agent, or Firm* — Staas & Halsey LLP

(57) ABSTRACT

An image scanning apparatus includes a scanner configured to scan a manuscript and generate a plurality of scan images; a discriminator configured to calculate a color ratio regarding each of the generated plurality of scan images, compare the calculated color ratio and a predetermined reference value, and discriminate color or black and white regarding each of the generated plurality of scan images; and a controller configured to control the discriminator so that a same discrimination is performed regarding 'a scan image having a color ratio within a predetermined range including the predetermined reference value' of among the plurality of scan images.

18 Claims, 13 Drawing Sheets

IMAGE SCANNING APPARATUS, METHOD FOR DISCRIMINATION OF COLOR AND COMPUTER-READABLE RECORDING MEDIUM

CROSS-REFERENCE TO RELATED APPLICATIONS

This application claims priority benefit from Korean Patent Application No. 10-2013-0092530, filed in the Korean Intellectual Property Office on Aug. 5, 2013, the disclosure of which is incorporated herein by reference.

BACKGROUND

1. Field

Embodiments relate to an image scanning apparatus, method for discrimination of color and computer-readable recording medium, and more particularly, to an image scanning apparatus capable of performing the same color discrimination operation for the scan images having similar color ratios, a method for discrimination of color, and a computer-readable recording medium thereof.

2. Description of the Related Art

An image scanning apparatus is an apparatus for scanning an original image of a manuscript, picture or film and converting the scanned image into digital data. In such a case, the digital data may be displayed on a computer monitor or may be printed by a printer and be generated as an output image. Scanners, copy machines, facsimiles, and multi function peripheral (MFP) configured to provide all functions of a scanner, copy machine, facsimile, and multi function peripheral (MFP) are examples of image scanning apparatuses.

An image scanning apparatus performs operations of discriminating whether or not a manuscript is a color manuscript or a black and white manuscript for operations such as printing etc. More specifically, in the case of performing a copying operation for a double-sided manuscript, the image scanning apparatus discriminates whether a first side is a color manuscript or black or white manuscript after a scanning operation is performed on the first side, and discriminates whether a second side is a color manuscript or black and white manuscript after a scanning operation is performed on the second surface.

However, in the case of performing a conventional color discriminating operation, there were cases where different results came out from a double-sided manuscript when both sides were black and white or when both sides were color. More specifically, if there was a delicate difference due to the scanner or mechanical effects, there were cases where one side of the double-sided manuscript on the boundary is determined as a black and white manuscript whereas the other side is determined as a color manuscript.

Thus, in the case of discriminating whether a manuscript is a color manuscript or a black and white (or mono) manuscript, there was required a method for performing color discrimination independently even when front/back sides has a same image or has a similar color ratio, thereby preventing one side being printed in color, and the other side being printed in black and white.

SUMMARY

In an aspect of one or more embodiments, there is provided an image scanning apparatus which is capable of performing a same color discrimination operation regarding scan images having similar color ratios, a color discriminating method and computer readable recording medium thereof.

In an aspect of one or more embodiments, there is provided an image scanning apparatus comprising: a scanner configured to scan a manuscript and generate a plurality of scan images; a discriminator configured to calculate a color ratio regarding each of the generated plurality of scan images, compare the calculated color ratio and a predetermined reference value, and discriminate color or black and white regarding each of the generated plurality of scan images; and a controller configured to control the discriminator so that a same discrimination operation is performed regarding 'a scan image having a color ratio within a predetermined range including the predetermined reference value' of among the plurality of scan images.

In an aspect of one or more embodiments, if the calculated color ratio exists within the predetermined range, the controller may change the predetermined reference value, and control the discriminator so that a discrimination regarding a next scan image is performed by the changed reference value.

In an aspect of one or more embodiments, the discriminator may comprise a color block calculator configured to calculate a color ratio of the generated scan image; and a discriminator configured to discriminate color or black and white of the generated scan image based on the calculated color ratio and the predetermined reference value.

In an aspect of one or more embodiments, the color block calculator may divide the generated scan image into a plurality of areas, determine color or black and white of each of the divided plurality of areas, and calculate a color ratio based on the number of areas determined as color areas and the number of areas determined as black and white areas.

In an aspect of one or more embodiments, there may be further provided a storage configured to store the generated scan image and a discrimination result regarding the generated scan image.

In an aspect of one or more embodiments, the scanner may scan both sides of the manuscript and generate a first scan image and a second scan image.

In an aspect of one or more embodiments, if the color ratio calculated regarding the first scan image and the color ratio calculated regarding the second scan image exist within the predetermined range, the controller may control the discriminator so that the discrimination regarding the second scan images uses the same discrimination result used for the first scan image.

In an aspect of one or more embodiments, the scanner may sequentially scan one side of a plurality of manuscripts and generates a plurality of scan images.

In an aspect of one or more embodiments, the controller may control the discriminator so that a same discrimination operation can be performed regarding 'a scan image having a color ratio within a predetermined range including the predetermined reference value' of among the plurality of scan images in a predetermined scanner having a plurality of scanner units.

In an aspect of one or more embodiments, the plurality of scanner units may be unit number 2.

In an aspect of one or more embodiments, there is provided a color discriminating method of an image scanning apparatus, the method comprising: scanning a manuscript and generating a plurality of scan images; calculating a color ratio regarding each of the generated plurality of scan images; and comparing the calculated color ratio and a predetermined reference value, and discriminating color or black and white regarding each of the generated plurality of scan images, wherein the discriminating involves performing a same discrimination operation regarding 'a scan image having a color ratio within a predetermined range including the predetermined reference value' of among the plurality of scan images.

In an aspect of one or more embodiments, if the calculated color ratio exists within the predetermined range, the discriminating may involve changing the predetermined reference value, and performing discrimination regarding a next scan image using the changed reference value.

In an aspect of one or more embodiments, the calculating a color ratio may include dividing the generated scan image into a plurality of areas, determining color or black and white of each of the divided plurality of areas, and calculating a color ratio based on the number of areas determined as color areas and the number of areas determined as black and white areas.

In an aspect of one or more embodiments, there may be further provided comprising storing the generated scan image and a discrimination result regarding the generated scan image.

In an aspect of one or more embodiments, the generating may involve scanning both sides of the manuscript and generating a first scan image and a second scan image.

In an aspect of one or more embodiments, if the color ratio calculated regarding the first scan image and the color ratio calculated regarding the second scan image exist within the predetermined range, the discriminating may involve performing a same discrimination operation regarding the second scan image as that of the discriminating result regarding the first scan image.

In an aspect of one or more embodiments, the generating may involve sequentially scanning one side of a plurality of manuscripts and generating a plurality of scan images.

In an aspect of one or more embodiments, the discriminating may involve performing a same discrimination operation regarding 'a scan image having a color ratio within a predetermined range including the predetermined reference value' of among the plurality of scan images in a predetermined scanner having a plurality of scanner units.

In an aspect of one or more embodiments, the scanner having a plurality of scanner units may be 2.

In an aspect of one or more embodiments, there is provided a computer readable recording medium storing computer readable instructions, which when executed, controls at least one processor to perform a color discriminating method, wherein the color discriminating method comprises calculating a color ratio regarding each of a plurality of scan images; and comparing the calculated color ratio and a predetermined reference value, and discriminating color or black and white regarding each of the plurality of scan images, wherein the discriminating performs a same discrimination operation regarding 'a scan image having a color ratio within a predetermined range including the predetermined reference value' of among the plurality of scan images.

In an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, with reference to the accompanying drawings, in which.

DETAILED DESCRIPTION

Figure 1:
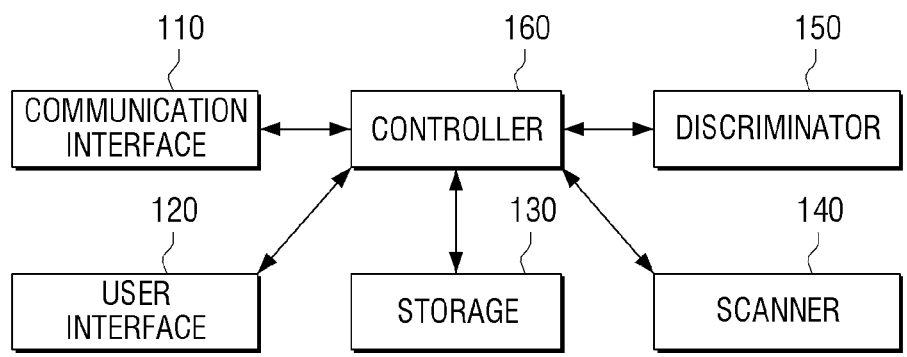
FIG. 1 is a block diagram illustrating a configuration of an image scanning apparatus according to an exemplary embodiment.

Exemplary embodiments are described in higher detail below with reference to the accompanying drawings, wherein like reference numerals refer to like elements throughout.

The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a configuration of an image scanning apparatus according to an exemplary embodiment.

With reference to FIG. 1, the image scanning apparatus 100 comprises a communication interface 110, user interface 120, storage 130, scanner 140, discriminator 150, and controller 160. Such an image scanning apparatus 100 may be a scanner, copy machine, facsimile, or a multi function peripheral (MFP) configured to provide all the functions of a scanner, copy machine, and facsimile in one device.

The communicator interface 110 may be connected to a terminal apparatus (not illustrated) such as a PC, notebook PC, PDA, and digital camera etc., and may transmit an image scanned in the image scanning apparatus 100 to the terminal. More specifically, the communication interface 110 is provided to connect the image scanning apparatus 100 to the external apparatus, and it may not only be provided in a format accessible through a USB (Universal Serial Bus) port, but may also be provided in a format accessible through a wireless port. The terminal apparatus may not only be an apparatus like a PC, but may also be an electronic apparatus where contents may be stored such as a smart phone, PMP, and MP3.

The communication interface 110 may receive an input of a scan command. More specifically, the communication interface 110 may receive an input of a scan command or a scanned image transmission command from a terminal apparatus.

The user interface 120 is provided with various function keys whereby the user may set or select the various functions provided in the image scanning apparatus 100, and the user interface 120 displays various information provided from the image scanning apparatus 100. The user interface 120 may be embodied as an apparatus where inputting and outputting may be embodied at the same time such as a touch screen 120, or an apparatus through a combination of a mouse and monitor.

Furthermore, the user interface 120 receives a scan command from the user. The user interface 120 may receive an input of whether or not to perform synchronization of color discrimination as an option that will be explained below. In addition, the user interface 120 may receive an input of whether or not to pre-scan. The pre-scan is a method of quickly scanning the manuscript at a low resolution prior to scanning the manuscript at a high resolution. It may be used when designating a scanning area.

In addition, the user interface 120 may display a scanned image. More specifically, the user interface 120 may display a scan image generated by a pre-scan operation as a preview, or display a scan image generated by a scanning operation.

The storage 130 may store a scan image (or scan data) scanned in the image scanning apparatus. In addition, the storage 130 may store whether color or black and white was discriminated in the discriminator 150 to be explained together with the scan image generated in the scanner 140. In addition, the storage 130 may store the scan image processed in the controller 160.

Such a storage 130 may be embodied as a storage medium or external storage medium inside the image scanning apparatus 100, for example a removable disk including a USB, a storage medium connected to a host, or a web server through a network etc.

The scanner 140 scans a manuscript and generates a scan image. More specifically, the scanner 140 comprises a light emitter (not illustrated) emitting light to a manuscript, a lens portion (not illustrated) forming an image of the light reflected from the manuscript on an image sensor inside, and an image sensor etc., and reads image information of the manuscript from the light formed on the image sensor. Such a scanner 140 may be an apparatus for scanning a manuscript placed on a flatbed, an apparatus for scanning a side or both sides of a manuscript provided in a duplex automatic manuscript feeder (DADF), or an apparatus where these two apparatuses are combined.

Figure 8:
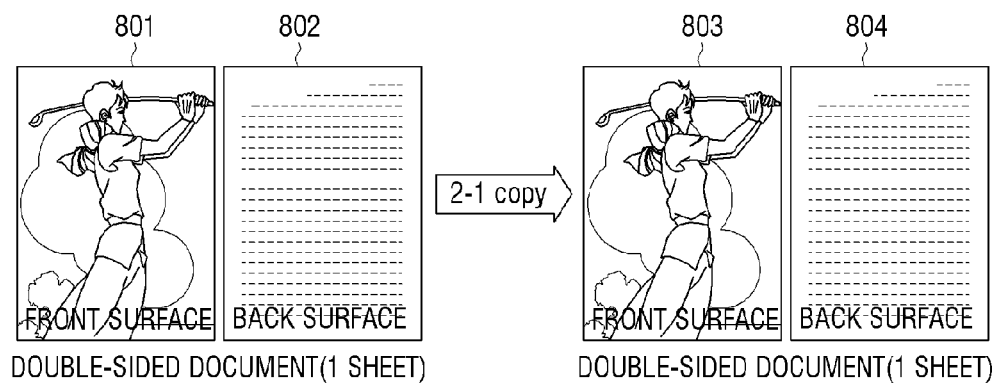
FIGS. 8 to 10 are views illustrating application examples in various printing environments.
Figure 9:
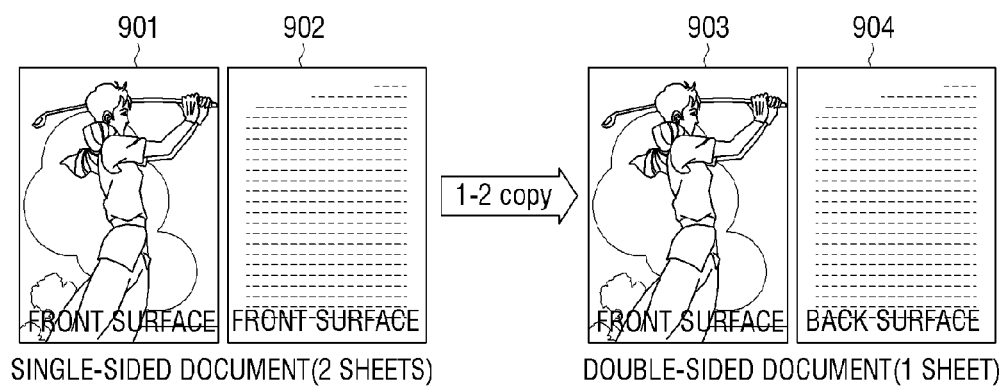
Figure 10:
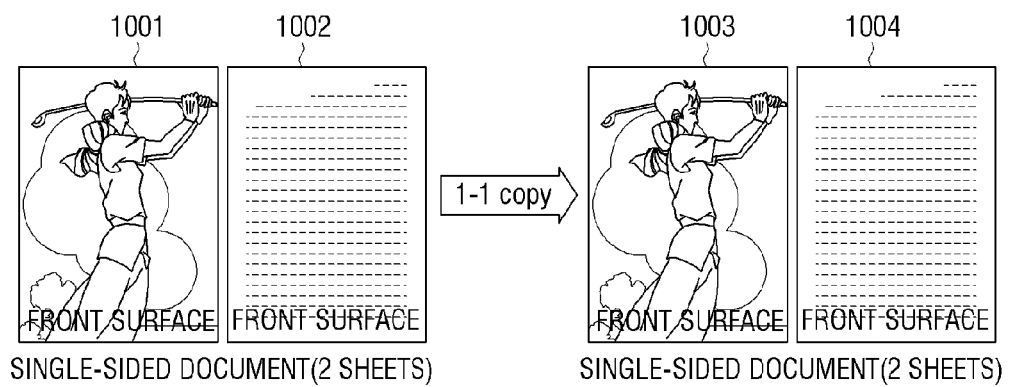

Therefore, as illustrated in FIG. 8, the scanner may generate a first scan image (scan image corresponding to the front side of the manuscript) and a second scan image (scan image corresponding to the back side of the manuscript) regarding both sides of the manuscript. Otherwise, as illustrated in FIG. 9 or FIG. 10, the scanner 140 may generate a scan image corresponding to each of the plurality of manuscripts regarding one side of the manuscript.

Furthermore, the scanner 140 may scan the manuscript a plurality of times. More specifically, the scanner 140 may quickly scan the manuscript a plurality of times. More specifically, the scanner 140 may quickly scan the manuscript at a low resolution (first resolution) (pre-scan) to generate a scan image having a low resolution, and perform a second scanning on the manuscript at a high resolution (second resolution) after the pre-scan to generate a scan image.

The discriminator 150 calculates the color ratio for each of the plurality of scan images generated, and compares the calculated color ratio and the predetermined reference values to discriminate color or black and white regarding each of the plurality of scan images generated. More detailed configuration and operations of the discriminator 150 will be explained in more detail below with reference to FIG. 2.

The controller 160 performs controlling of each configuration inside the image scanning apparatus 100. More specifically, upon receiving a scan command from the user interface 120 or communication interface 110, the controller 160 may control the scanner to perform a scan operation, and may control the discriminator 150 so that color discrimination can be performed regarding the scan image generated in the scanner 140.

The controller 160 may control the discriminator 150 so that a same color discrimination operation may be performed regarding the scan image having the color ratio within the predetermined range including the predetermined reference value of among the plurality of scan images. That is, if the calculated color ratio exists within the predetermined range, the controller 160 may change the predetermined reference value, and control the discriminator 150 so that color discrimination regarding the next scan image may be performed by the changed reference value.

In addition, the controller 160 performs image processing regarding the scanned image. More specifically, the controller 160 may perform the image processing function performed in a general image scanning apparatus 100. In an exemplary embodiment, the controller 160 performs the image processing function, but in other exemplary embodiments, an additional exclusive hardware or other configuration may be used to perform image processing.

In addition, the controller 160 may control the communication interface 110 so that the generated scan image or modified scan image can be stored, and may control the communication interface 110 so that the stored scan image can be transmitted to an external terminal (or a specific storage medium designated by the user). In addition, although not illustrated in an exemplary embodiment, in the case of an MFP where the image scanning apparatus 100 can perform a printing operation, the controller 160 may have the generated scan image be printed. The controller 160 may print the generated plurality of scan images on double-sided manuscripts as illustrated in FIG. 8 or FIG. 9, or on single-sided manuscripts as illustrated in FIG. 10.

The image scanning apparatus 100 according to an exemplary embodiment brings about the same result regarding the color discrimination between scan images of which the calculated color ratio exists within the predetermined range, and thus prevents difference of quality from occurring between scan images due to mechanical effects.

In an exemplary embodiment, it is illustrated that generating a scan image and color discrimination are performed by one scan operation, but depending on exemplary embodiments, the color discrimination may be performed through a pre-scan operation and the second scanning may be performed according to the result of discrimination.

Figure 2:
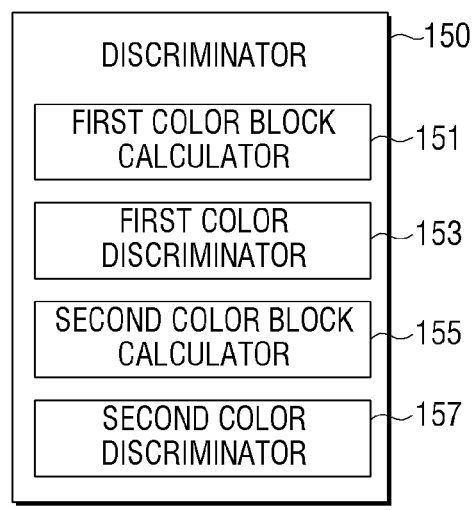
FIG. 2 is a block diagram specifically illustrating a discriminator according to an exemplary embodiment.

FIG. 2 is a block diagram illustrating the specific configuration of the discriminator of FIG. 1.

With reference to FIG. 2, the discriminator 150 comprises a first color block calculator 151, first color discriminator 153, second color block calculator 155, and second color discriminator 157.

The first color block calculator 151 calculates the color ratio of the generated scan image. More specifically, in the case where the scanner 140 scans the first side of the manuscript and generates a first scan image, the first color block calculator 151 may divide the first scan image into a plurality of areas, determine color or black or white of each of the plurality of areas, and calculate the color ratio based on the number determined as color areas and the number determined as black and white areas. The first color block calculator 151 may calculate the aforementioned color ratio only regarding the area except for the blank (or empty area) on the scanned first image. Calculating the color ratio is a well known technology, and thus detailed explanation is omitted.

The first color discriminator 153 calculates whether the generated scan image is color or black and white based on the calculated color ratio and predetermined reference value. More specifically, the first color discriminator 153 may discriminate color or black and white by mutually comparing the color ratio calculated in the first color block calculator 153 regarding the first scan image with the reference value determined as default. For example, if the calculated color ratio is smaller than the predetermined color reference value, it may be discriminated as black and white, whereas if the calculated color ratio is greater than the predetermined color reference, it may be discriminated as color.

The predetermined reference value is the reference value determined by the manufacturer regarding the image scanning apparatus 100. In the past, the predetermined reference value was a fixed value, but in an exemplary embodiment, it is adjusted within the predetermined range so that a same result may be discriminated regarding the scan image having a similar color ratio. Such an adjustment may be performed in predetermined scan image units (predetermined image scanners). For example, in two page units, that is, a double-sided scan, regarding the first sheet, the default reference value may be applied, and regarding the next sheet, the default reference value modified according to the previous color reference value may be applied, and regarding the third sheet, the default reference value may be applied. It may also be predetermined such that the same discrimination may be performed in scan operation units.

When the calculated color ratio exists within the predetermined range, the first color discriminator 153 may change the predetermined reference value. More specifically, if the color ratio regarding the first scan image calculated in the first color block calculator 151 exists within the predetermined range, the first color discriminator 153 may adjust the predetermined reference value within the predetermined range. Accordingly, the second color discriminator 157 that will be explained below becomes capable of performing the same discrimination operation with the first color discriminator 153 regarding the scan image of which the color ratio exists within the predetermined range.

In an exemplary embodiment, the first color discriminator 153 changes the reference value, but depending on exemplary embodiments, without changing the reference value of the first color discriminator 153, only the fact that the reference value changed during discriminating operation of the second color discriminator 157 should be used may be transmitted to the second color discriminator 157.

The second color block calculator 155 calculates the second color ratio of the next scan image. More specifically, in the case where the scanner 140 scans the second side of the manuscript to generate a second scan image, the second color block calculator 155 divides the second scan image into a plurality of areas, determines color or black or white of each of the divided plurality of areas, and calculates the second color ratio based on the number of areas determined as color areas and the number of areas determined as black and white areas.

The second color block calculator 155 may calculate the second color ratio only regarding the area except for the blank area (empty area) on the scanned second image.

The second color discriminator 157 calculates whether the generated scan image is color or black and white based on the calculated second color ratio and the determined reference value. More specifically, the second color discriminator 157 may discriminate color or black or white by mutually comparing the second color ratio regarding the second scan image calculated in the second color block calculator 155 with the currently determined reference value (the default reference value in the case where the reference value is not changed in the first color discriminator, and the changed reference value in the case where the reference value is changed in the first color discriminator). The specific discriminating process is the same as in the first color discriminator 153.

According to exemplary embodiments, in the case where the first color discriminator 153 does not change the reference value and only that a change is necessary is notified (that is, when determining the flag), the second color discriminator 157 checks whether or not the flag is determined, whereas when the flag is determined, may change the predetermined reference value.

In explaining FIG. 2, it has been illustrated and explained that a plurality of color block calculators and a plurality of color block discriminators are included in one discriminator, but depending on exemplary embodiments, only one color block calculator and one color block discriminator may be used to perform the same operation.

Furthermore, in explaining FIG. 2, it has been explained that the first color block calculator and one color discriminator are used regarding a side of the manuscript, and the second color block calculator and second color discriminator are used regarding the scan image regarding the other side of the manuscript, the processing of the first scan image having the color ratio within the predetermined range including the predetermined reference value of among the plurality of scan images may be performed in the first color block calculator and the first color discriminator, and the processing of the subsequent scan images may be performed in the second color block calculator and the second color discriminator.

Figure 3:
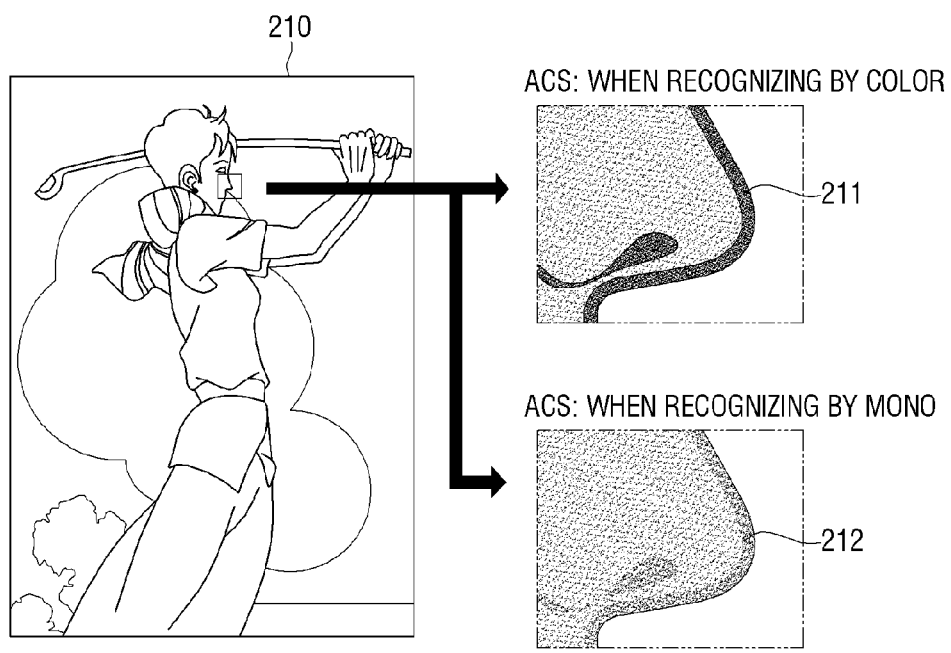
FIG. 3 is a view for explaining operations of a discriminator of FIG. 1.

FIG. 3 is a view for explaining operations of the discriminator of FIG. 1.

With reference to FIG. 3, the scanner 140 scans the manuscript and generates a scan image 210. When such a scan image 210 is generated, the discriminator 150 divides the scan image 210 into a plurality of areas, and determines color or black and white of each of the divided plurality of areas. In addition, the discriminator 150 calculates the color ratio of the areas determined as color areas and the areas determined as black and white areas according to the determined color or black and white regarding each area, and discriminates color or black and white regarding the scan image 210 according to the calculated color ratio.

When the scan image 210 is discriminated as a color area by the above process, the corresponding scan image 210 may be printed in color 211. On the other hand, when the scan image 210 is discriminated as a black and white area, the corresponding scan image 210 may be printed in black and white 212.

The process of discriminating color or black and white using the calculated color ratio is performed by mutually comparing the calculated color ratio and the predetermined reference value, wherein if the color ratio is smaller than the predetermined value, the scan image is discriminated as black and white, whereas if the color ratio is greater than the predetermined value, the scan image is discriminated as color.

However, in the past, the color discrimination operation was performed according to whether or not the color ratio is smaller or greater than a fixed reference value, and thus the scan image having a color ratio a little greater than the reference value and the scan image having a color ratio smaller than the reference value had different color discrimination results. Therefore, the color discrimination and printing could be performed in a direction not wanted by the user.

Therefore, in an exemplary embodiment, regarding the scan image having a color ratio within the predetermined range as aforementioned, an identical discrimination operation is performed, Below is explanation on discrimination operations in various environments with reference to FIGS. 4 to 7.

FIGS. 4 to 7 are views illustrating various examples of color discrimination in a double-sided manuscript. More specifically, in FIGS. 4 to 7, Th is a predetermined reference value, and Th−a~Th+a is a predetermined range including the predetermined reference value. Furthermore, C1 is the color ratio of the first image, while C2 is the color ratio of the second image.

Figure 4:
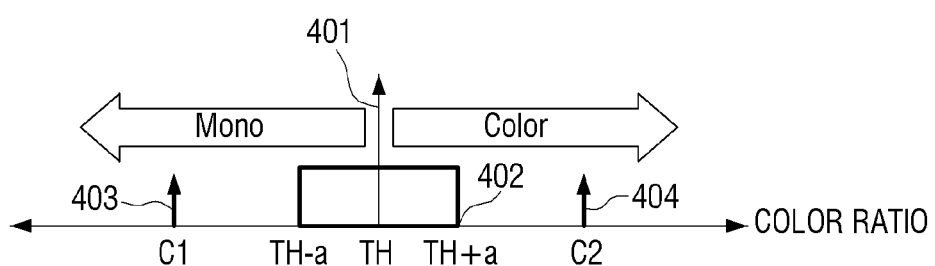
FIGS. 4 to 7 are views illustrating various examples of color discrimination in a double-sided manuscript.

With reference to FIG. 4, first of all, the discriminator 150 performs color discrimination regarding the first image. More specifically, the color ratio of the first image C1 403 is smaller than the reference value 401, and thus the discriminator 150 may discriminate the first image as a black and white image.

In addition, since the color ratio C1 403 of the discriminator 150 is not located within the predetermined range, the discriminator 150 does not change the reference value. That is, the discriminator 150 does not determine the flag.

Next, the discriminator 150 performs color discrimination regarding the second image. More specifically, since the color ratio 404 C2 of the second image is greater than the reference value 401, the discriminator 150 may discriminate the second image as a color image.

Figure 5:
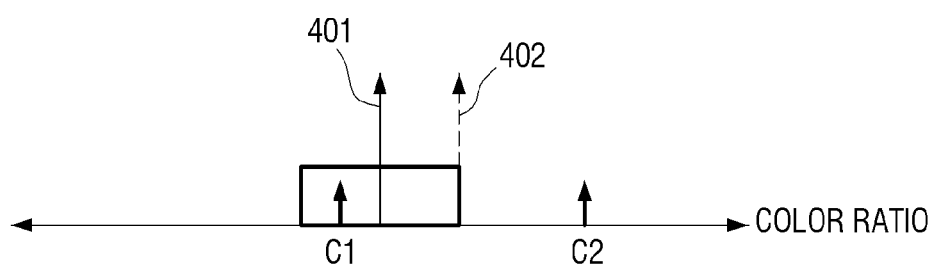

With reference to FIG. 5, first of all, the discriminator 150 performs color discrimination regarding the first image. More specifically, since the color ratio C1 of the first image is smaller than the reference value 401, the discriminator 150 may discriminate the first image as a black and white image.

In addition, since the color ratio C1 of the first image is located within the predetermined range, the discriminator 150 moves the reference value 401 to the rightmost side of the predetermined range. More specifically, regardless of where the color ratio of other images exists, the reference value 401 may be moved to the rightmost side Th+a of the predetermined range so images are properly discriminated as black and white images. Such an operation may be expressed in an operation of determining a flag as aforementioned.

Next, the discriminator 150 performs color discrimination regarding the second image. More specifically, since the color ratio C2 of the second is greater than the changed reference value 402, the discriminator 150 may discriminate the second image as a color image.

Figure 6:
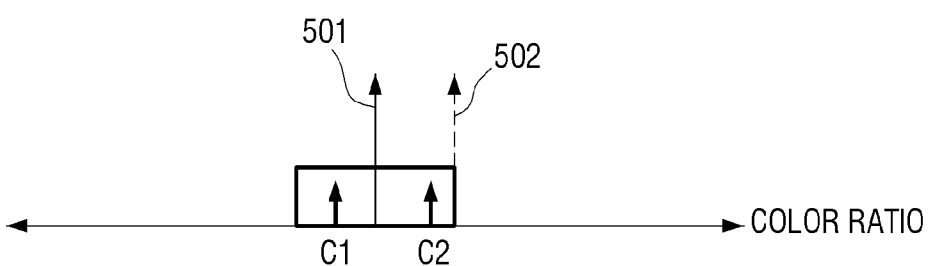

With reference to FIG. 6, the discriminator 150 performs color discrimination regarding the first image. More specifically, since the color ratio C1 of the first image is smaller than the reference value 401, the first image may be discriminated as a black and white image. Furthermore, since the color ratio C1 of the first image is located within the predetermined range, the discriminator 150 moves the reference value 501 to the rightmost 502 side of the predetermined range. Such an operation may be expressed in an operation of determining a flag as aforementioned.

Next, the discriminator 150 performs color discrimination regarding the second image. More specifically, since the color ratio C2 of the second image is smaller than the changed reference value 502, the discriminator 150 may discriminate the second image as a black and white image.

Figure 7:
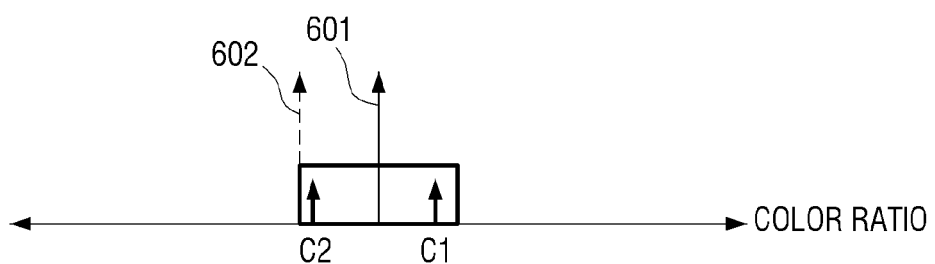

With reference to FIG. 7, first of all, the discriminator 150 performs color discrimination regarding the first image. More specifically, since the color ratio C1 of the first image is greater than the reference value 601, the discriminator 150 may discriminate the first image as a color image. In addition, since the first color ratio C1 of the first image is located within the predetermined range, the discriminator 150 may move the reference value 601 to the leftmost side 602 of the predetermined range. More specifically, regardless of where the next color ratio is located within the predetermined range, the discriminator 150 may move the reference value 601 to the leftmost Th−a of the predetermined range so as to be discriminate as a color image. Such an operation may be expressed in an operation of determining a flag as aforementioned.

Next, the discriminator 150 may perform color discrimination regarding the second image. More specifically, since the color ratio C2 of the second image is greater than the changed reference value 602, the discriminator 150 may discriminate the second image as a color image.

FIGS. 8 to 10 are views illustrating application examples in various printing environments.

FIG. 8 is a case of a double-sided scan and double-sided printing combined. More specifically, the scanner 140 scans one side 801 of the manuscript and generates a first scan image 803, and scans the other side 802 to generate a second scan image 804.

Next, the discriminator 150 calculates the color ratio regarding the first scan image 803 generated, and performs color or black and white discrimination. In addition, the discriminator 150 calculates the color ratio regarding the second scan image 804 generated, and performs color or black and white discrimination. Discriminating operations according to the color ratio of each of the first scan image 803 and second scan image 804 were explained above with reference to FIG. 7, and thus detailed explanation is omitted.

In addition, in the case where the image scanning apparatus 100 is a multi-function printer (MFP) capable of performing a printing operation, the image scanning apparatus 100 may perform printing operations according to the discriminated color or black and white. For example, in the case where the first scan image 803 and second scan image 804 are all discriminated as color images, the image scanning apparatus 100 may color print the first scan image 803 for the first side of the paper, and color print the second scan image 804 for the second side of the paper.

In the case where the first scan image 803 is discriminated as a black and white image and the second scan image 804 is discriminated as a color image, the image scanning apparatus 100 may print the first scan image 803 regarding the first side of the paper in black and white, and color print the second scan image 804 regarding the second side of the paper.

In the case where the first scan image 803 is discriminated as a black image and white and the second scan image 804 is discriminated as a color image, the image scanning apparatus 100 may print the first scan image 803 regarding the first side of the paper in black and white, and color print the second scan image 804 regarding the second side of the paper.

In the case where the first scan image 803 and second scan image 804 are both discriminated as black and white images, the image scanning apparatus 100 may print the first scan image 803 regarding the first side of the paper in black and white and print the second scan image 804 regarding the second side of the paper in black and white as well.

Although it was explained above that printing operations are performed according to the color discrimination results, in the case where the MFP is an MFP only capable of black and white printing, or where printing is limited to black and white printing even if color printing is possible, the image scanning apparatus 100 may print both the first scan image and second scan image in black and white regardless of the color discrimination.

FIG. 9 is a case of a single-sided scan and double-sided printing combined. More specifically, the scanner 130 scans only one side of a plurality of manuscripts 901, 902, and generates a plurality of scan images 903, 904.

Next, the discriminator 150 calculates the color ratio regarding the odd number scan image generated, and performs the color or black and white discrimination. In addition, the discriminator calculates the color ratio regarding the even number subsequent scan image and performs the color or black and white discrimination. It was explained that color discrimination is made in two page units (that is one printing paper unit), but depending on exemplary embodiments, the color discrimination may be performed in operation units. For example, in the case where 1-2 copy command is input regarding 10 manuscripts, the scan images having the color ratio within the predetermined range of among the 10 scan images may have the same discrimination results.

In addition, printing operations according to the discrimination results regarding each of the scan images may be performed.

FIG. 10 is a case of a single-sided scan and single-sided printing combined. More specifically, the scanner 140 scans only one side of each of a plurality of manuscripts 1001, 1002, and generates a plurality of scan images 1003, 1004.

Next, the discriminator 150 may perform the same discrimination for scan images having the color ratio within the predetermined range of among the plurality of scan images generated.

In addition, printing operations according to the discrimination results regarding each of the scan images may be performed.

Figure 11:
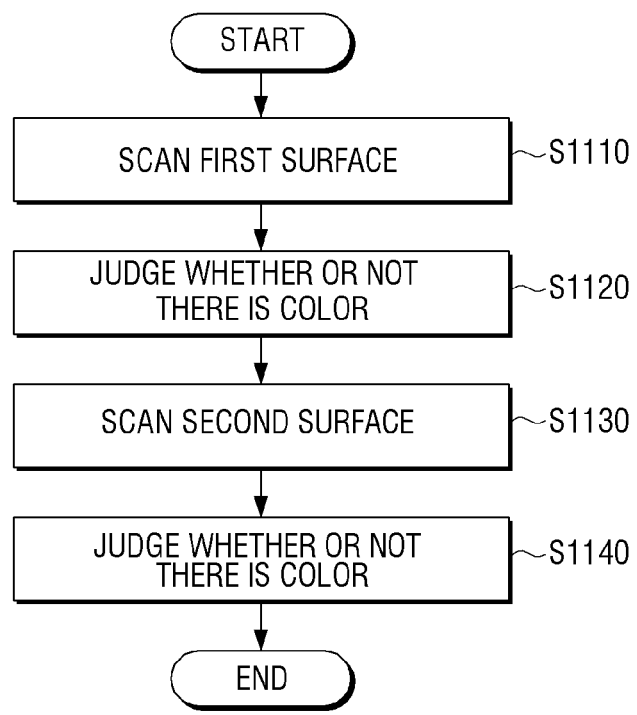
FIG. 11 is a flowchart for explaining a color discrimination method according to an exemplary embodiment.

FIG. 11 is a flowchart for explaining a color discrimination method according to an exemplary embodiment.

With reference to FIG. 11, a manuscript is scanned and a plurality of scan images are generated. More specifically, in the case of performing a double-sided scanning, a first scan image regarding the first side of the manuscript is generated (S1110), and a second scan image regarding the second side of the manuscript (side opposite the first side) may be generated (S1130).

In addition, a color or black and white discrimination regarding each of the plurality of scan images generated is performed (S1120, S1140). More specifically, the color ratio regarding the first scan image may be calculated, and the calculated color ratio and the predetermined reference value may be compared so as to discriminate color or black and white of the first scan image generated. If the color ratio of the first scan image is within the predetermined range, the predetermined reference value may be changed within the predetermined range, and the discrimination of color or black and white regarding the second scan image may be made based on the changed reference value. The operations of the color or black and white discrimination will be explained in more detail with reference to FIGS. 12 and 13.

As aforementioned, the image correcting method according to an exemplary embodiment discriminates the same color between the scan images of which the calculated color ratios exist within the predetermined range, thereby preventing differences of quality between scan images due to mechanical effects etc. The color discrimination method as in FIG. 11 may be performed on the image scanning apparatus having the configuration of FIG. 1, and on the image scanning apparatus having other configurations.

Furthermore, the color discrimination method as aforementioned may be embodied as a program (or application) including the algorithm executable in a computer, and the program may be stored in and provided by a non-transitory computer readable medium.

A non-transitory computer readable medium refers to a medium where data can be stored semi-permanently and not a medium which stores data for a short period of time such as a cache and memory etc. More specifically, the aforementioned various applications or programs may be stored in and provided by non-transitory computer readable medium such as a CD, DVD, hard disk, blue ray disk, USB, memory card, and ROM etc.

Figure 12:
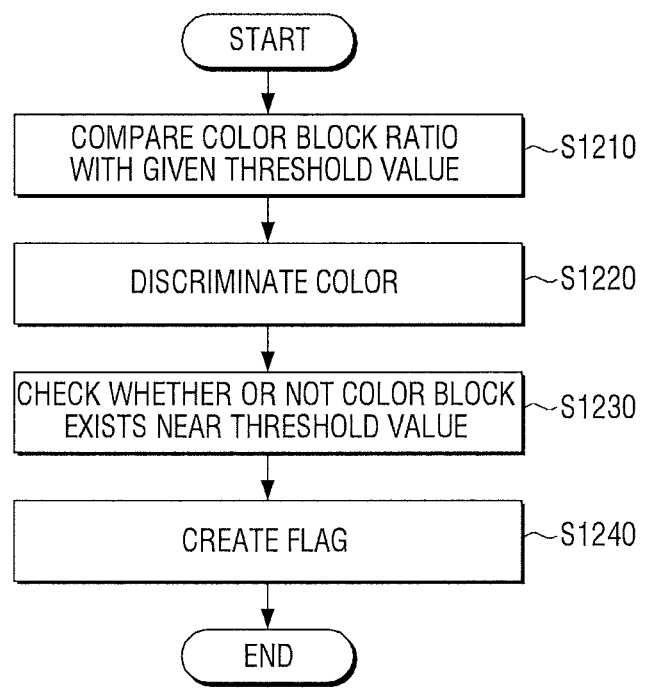
FIG. 12 is a flowchart for explaining a first color discriminating step of FIG. 11.

FIG. 12 is a flowchart for explaining a first color discrimination step of FIG. 11.

With reference to FIG. 12, a color ratio regarding a first scan image is calculated (S1210). More specifically, it is possible to divide the first scan image into a plurality of areas, discriminate color or black and white for each of the divided areas, and calculate the ratio of the area discriminated as a color area and the area discriminated as the black and white area.

In addition, the calculated color ratio and the predetermined reference value are compared to each other, to discriminate color or black and white regarding the first scan image (S1220).

In addition, it is determined whether or not the calculated color ratio exists within the predetermined range (S1230). If the calculated color ratio exists within the predetermined range, and the color ratio calculated when discriminating the next scan image exists in the same predetermined range, it is possible to set a flag notifying that the same discrimination operation must be performed (S1240).

Figure 13:
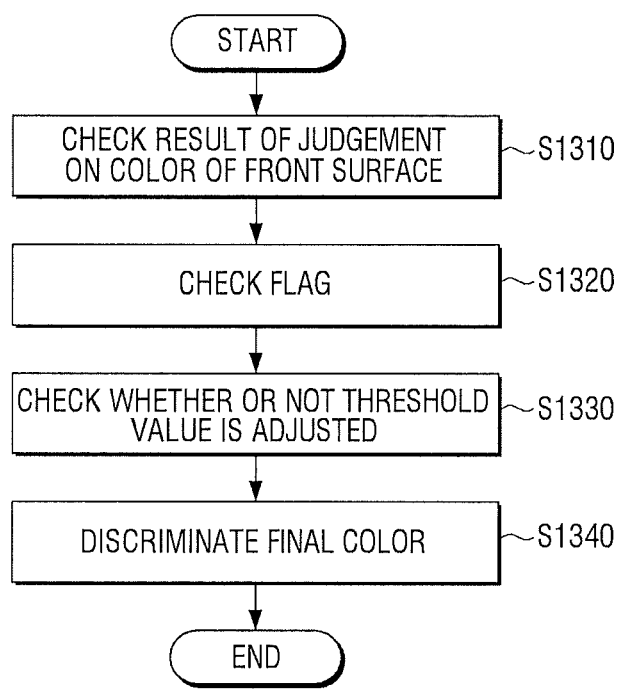
FIG. 13 is a flowchart for explaining a second color discriminating step of FIG. 13.

FIG. 13 is a flowchart for explaining a second color discrimination step of FIG. 11.

With reference to FIG. 13, the discrimination result of the first scan image is checked (S1310), and whether or not a flag is determined is checked (S1320). More specifically, in order to check whether or not to change the reference value when discriminating the second scan image and apply the changed reference value, and to identify in which direction to change the reference value when changing the reference value is necessary, it is possible to check the discrimination result of the first scan image.

The predetermined reference value is adjusted by whether or not a flag is set (S1330). More specifically, when a flag is set, the predetermined reference value is adjusted, and when a flag is not determined, the predetermined reference value is not adjusted.

In addition, the color ratio regarding the second scan image is calculated. More specifically, the first scan image is divided into a plurality of areas, discrimination of color or black and white is made for each of the divided areas, and the color ratio of the area discriminated as color and area discriminated as black and white may be calculated.

Furthermore, the calculated color ratio and the adjusted reference value are compared to each other, to discriminate color or black and white of the first scan image (S1340).

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments have been shown and described above, it would be appreciated by those skilled in the art that changes may be made in these embodiments without departing from the principles and spirit of the disclosure, the scope of which is defined in the claims and their equivalents.

What is claimed is:

1. An image scanning apparatus comprising:
    a scanner to scan a manuscript and generate scan images;
    a discriminator to calculate a color ratio for generated scan images, compare the calculated color ratio and a predetermined reference value, and discriminate color or black and white for the generated scan images based on the comparison; and
    a controller to control the discriminator so that a same color discrimination is performed regarding or on scan images having similar color ratios to achieve the same color discrimination result,
    wherein if the calculated color ratio of one of the scan images exists within a predetermined range, the controller changes the predetermined reference value, and controls the discriminator so that discrimination for the next scan image is performed using the changed reference value.

2. The image scanning apparatus according to claim 1, wherein:
    the discriminator comprises a color block calculator configured to calculate color ratios of the generated scan images; and
    the discriminator discriminates color or black and white of the generated scan images based on the corresponding calculated color ratios and the predetermined reference value.

3. The image scanning apparatus according to claim 2, wherein, for each generated scan image, the color block calculator divides the generated scan image into a plurality of areas, determines color or black and white of each of the divided plurality of areas, and calculates the color ratio based on the number of areas determined as color areas and the number of areas determined as black and white areas.

4. The image scanning apparatus according to claim 1, further comprising a storage to store the generated scan images and discrimination results of the generated scan images.

5. The image scanning apparatus according to claim 1, wherein the scanner scans both sides of the manuscript and the scanner generates a first scan image and a second scan image.

6. The image scanning apparatus according to claim 5, wherein if the calculated color ratio of the first scan image and the calculated color ratio of the second scan image exist within the predetermined range, the controller controls the discriminator so that the discrimination of the second scan image is the same as the discrimination result of the first scan image.

7. The image scanning apparatus according to claim 1, wherein the scanner sequentially scans one side of each of a plurality of manuscripts and generates the scan images.

8. The image scanning apparatus according to claim 1, wherein the controller controls the discriminator so that a same color discrimination is performed regarding or on scan images having similar color ratios to achieve the same color discrimination result in a predetermined scanner having a plurality of scanner units.

9. The image scanning apparatus according to claim 8, wherein the plurality of scanner units is 2.

10. A color discriminating method of an image scanning apparatus, the method comprising:
    scanning a manuscript and generating scan images;
    calculating a color ratio for each of the generated scan images; and
    comparing the calculated color ratio and a predetermined reference value, and
    discriminating color or black and white for each of the generated scan images,
    wherein the discriminating includes performing a same color discrimination is performed regarding or on scan images having similar color ratios to achieve the same color discrimination result, and
    wherein if the calculated color ratio of one of the generated scan images exists within the predetermined range, the discriminating includes changing the predetermined reference value, and performing discrimination for a next scan image using the changed reference value.

11. The method according to claim 10, wherein, for each scanned image, the calculating of the color ratio includes dividing the one generated scan image into a plurality of areas, determining color or black and white of each of the divided plurality of areas, and calculating the color ratio based on the number of areas determined as color areas and the number of areas determined as black and white areas.

12. The method according to claim 10, further comprising storing the generated scan images and a discrimination result for the generated scan images.

13. The method according to claim 10, wherein the generating includes scanning both sides of the manuscript and generating a first scan image and a second scan image.

14. The method according to claim 13, wherein if the calculated color ratio of the first scan image and the calculated color ratio of the second scan image exist within the predetermined range, the discriminating includes performing a same discrimination for the second scan image as that of the discriminating result for the first scan image.

15. The method according to claim 13, wherein the discriminating includes performing a same color discrimination regarding or on scan images having similar color ratios to achieve the same color discrimination result in a predetermined scanner having a plurality of scanner units.

16. The method according to claim 15, wherein the plurality of scanner units is 2.

17. The method according to claim 10, wherein the generating includes sequentially scanning one side of a plurality of manuscripts and generating the scan images.

18. At least one non-transitory computer readable recording medium storing computer readable instructions, which when executed, controls at least one processor to perform a color discriminating method, wherein the color discriminating method comprises:

calculating a color ratio for each of a plurality of scan images; and comparing the calculated color ratios and a predetermined reference value, and discriminating color or black and white for each of the scan images, wherein the discriminating includes performing a same color discrimination regarding or on scan images having similar color ratios to achieve the same color discrimination result, and wherein if the calculated color ratio of one of the generated scan images exists within a predetermined range, the discriminating includes changing the predetermined reference value, and performing discrimination for a next scan image using the changed reference value.

* * * * *